United States Patent [19]
Hystad

[11] Patent Number: 5,423,146
[45] Date of Patent: Jun. 13, 1995

[54] SEINE RING DEVICE

[76] Inventor: Per H. Hystad, Jonas Lies veg 3 Ostemsneset, N-4250 Kopervik, Norway

[21] Appl. No.: 156,095

[22] Filed: Nov. 22, 1993

[51] Int. Cl.⁶ .............................................. A01K 73/12
[52] U.S. Cl. ........................................ 43/14; 24/573.5
[58] Field of Search ............. 24/135 A, 136 B, 135 R, 24/599.1, 599.3, 573.5, 598.2; 43/14, 27.2, 27.4, 8; 294/82.1, 82.19, 82.11

[56] References Cited

U.S. PATENT DOCUMENTS

| 693,413 | 2/1902 | Lufkin | 24/135 R |
| 2,036,135 | 3/1936 | Greenup | 294/82.19 |
| 2,506,655 | 5/1950 | Tremolada | 294/82.1 |
| 2,709,616 | 5/1955 | Larson | 294/82.1 |
| 4,329,927 | 5/1982 | Minshull | 294/82.1 |

FOREIGN PATENT DOCUMENTS

| 0103610 | 1/1964 | Norway | 43/14 |
| 0848819 | 9/1960 | United Kingdom | 24/135 A |
| 2235116 | 2/1991 | United Kingdom | 43/14 |

Primary Examiner—P. Austin Bradley
Assistant Examiner—James Miner
Attorney, Agent, or Firm—Merchant, Gould, Smith, Edell, Welter & Schmidt

[57] ABSTRACT

A seine ring which is equipped with a replaceable wearing piece, where the wearing piece is affixable to the mount part of the seine ring adapted for this function by means of a nut and bolt connection which is fed through a hole in the mount part. The hole is formed such that, seen from either side and along the axis thereof, it tapers towards the axial center of the hole. The wearing piece is given a clearance in relation to the mount part to facilitate its ability to tilt in relation to the mount part.

3 Claims, 3 Drawing Sheets

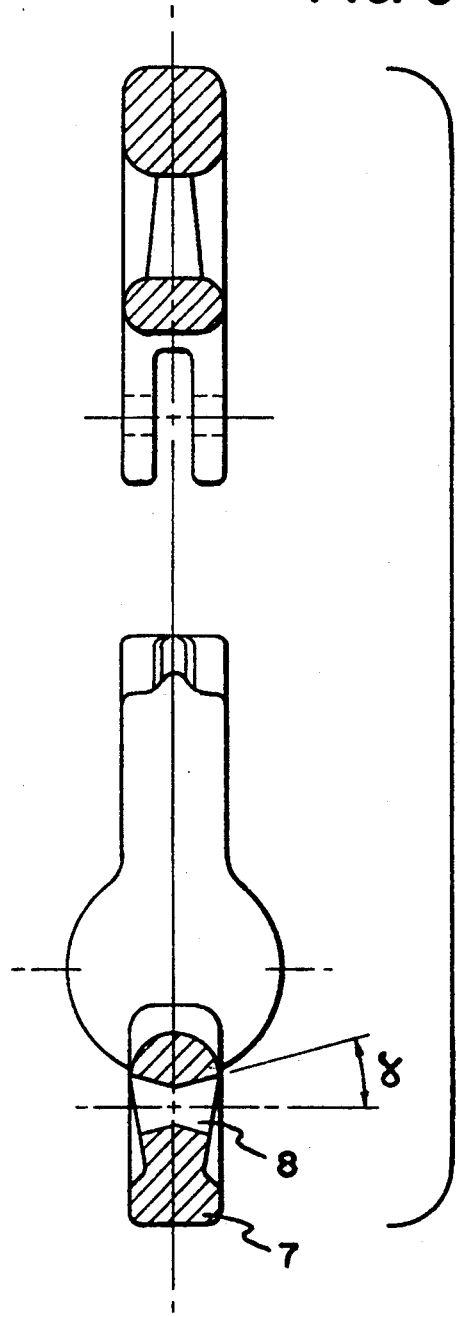
FIG. 5
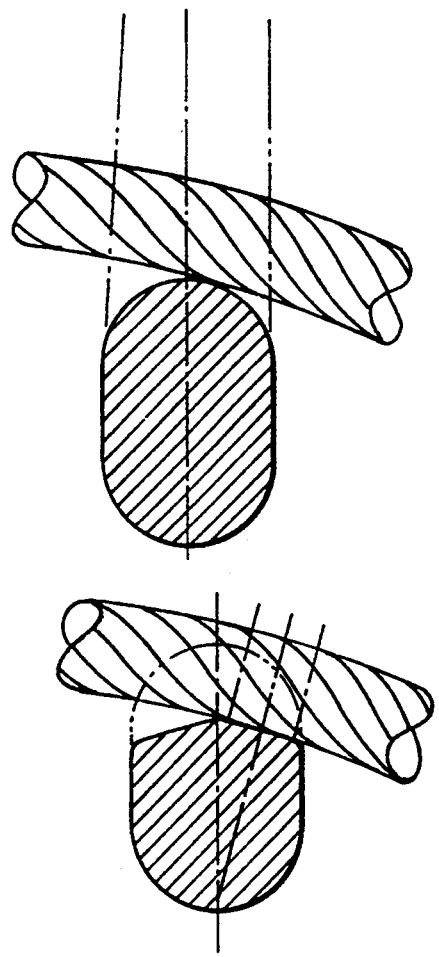
FIG. 1
(PRIOR ART)
FIG. 2

SEINE RING DEVICE

The present invention relates to a seine ring device which is equipped with a replaceable wearing piece and where the wearing piece is mounted on a part of the seine ring adapted for this function, e.g., by means of a nut and bolt connection which engages with the mount part.

When a purse seine is drawn together, the seine rings thereof will be exposed to force from the seine wire which gives a frictional force between the seine wire and the seine ring. This results in the ring and appurtenant crowfoot standing at an angle in relation to the seine wire, where the tangent of the angle will correspond to the coefficient of friction between the seine wire and the seine ring. If it were the case that the coefficient of friction was equal to zero, the seine ring and crowfoot would stand at right angles to the seine wire.

The fact that the seine ring is in an inclined position relative to the seine wire results, however, in the ring becoming unevenly worn. The seine ring is always clipped on to the wire at random, and the inclined position can change each time the seine is cast, depending upon how the ring is clipped on to the wire. In this way the seine ring will be worn on either side depending upon how the ring is clipped on to the wire. This results in the face of contact against which the wire rests being reduced in length and area. Moreover, it results in the surface pressure between the wire and the ring being much greater than if the wire had had a parallel direction of motion relative to the contact face of the ring.

A high surface pressure results in a higher coefficient of friction owing to the fact that the seine wire will function almost like a rasp against the seine ring. Wear of the seine ring and wire will, for this reason, be much greater than if there had been a large contact face between the ring and the wire, and thus a lower surface pressure.

It is an objective of the present invention to provide a seine ring which has a construction such that the seine wire will always have a maximum face of contact against the seine ring and that the contact face will remain the same irrespective of how the the seine ring is clipped on to the seine wire.

Studies of seine rings have shown that the crowfoot which connects the ring to the purse seine, stands at an angle of approx. 75° to the seine wire when the seine is drawn together. The coefficient of friction is thus 0,268 (tangent of 15°). The coefficient of friction may differ somewhat depending upon the kind of material of which the ring is made and the existing surface pressure.

The present invention is based on the use of a replaceable wear body which is automatically tilted by the seine wire in such a way that the wire has a maximum face of contact against the wear body on the seine ring.

The device mentioned by way of introduction is characterized according to the invention in that a wearing piece is mounted in such a way on the mount part that the wearing piece is automatically tilted by forces from a seine wire into a position that is such that the contact face between the wearing piece and the wire is of maximum size irrespective of the direction of motion of the wire.

According to further embodiments of the device, said mount part is provided with a rounded form in order to minimize the contact surface between the mount part and the adjacent surface of the wearing piece, in as much as the radius of curvature (radius) of said adjacent surface is greater than that of the mount part.

The mount has a hole for engagement with said nut and bolt connection, said hole being formed so that the wearing piece is is tiltable 10°-20°, preferably 15°, to either side in relation to the plane of the seine ring. The hole is formed in such a way that, seen from either side and along the axis thereof, it tapers towards the axial center of the hole, and the wearing piece is given a clearance relative to the mount part in order to facilitate its ability to tilt relative to said mount part. Said hole tapers at an angle of 10°-20°, preferably 15°, relative to the longitudinal axis of the hole. The mount part, at least over a portion of each side, tapers in the direction from the connection area between the mount and the wearing piece at an angle of 10°-20°, preferably 15°.

A technical solution is thus provided where the wearing piece places itself automatically in a position such that the seine wire moves parallel in relation to the contact face between the wearing piece and the seine wire. This is also the case when the wire changes direction due the seine ring being clipped on in such a way that the wire movement through the seine ring thereby changes direction. The contact face on the seine ring will be the same, even though the Wire changes direction of motion when the ring is clipped on in the opposite way. The ring thus has only one contact face, instead of two contact faces according to the known seine ring solutions. The seine ring, according to the present invention, thus has a replaceable and automatically pivotal wear body which positions itself automatically against the wire, so that the contact face between the wire and the wearing piece will be of maximum size, thereby reducing wear on the wire and the wearing piece and also reducing friction. The wear body is positioned automatically regardless of which way the wire is pulled through the ring.

A seine ring is thus provided with a replaceable and automatically tilting wearing piece that prevents wear on the ring itself. The wear occurs instead on the actual wearing piece as even, parallel wear and the wearing piece is replaced when it is worn out, i.e., when the wear surface has a predetermined minimum thickness. The seine ring itself will thus not be worn as it is not in direct contact with the seine wire.

Since the wearing piece is tilted by the seine wire so that the contact face is parallel to the direction of motion of the seine wire irrespective of the direction of motion of the seine wire, the wearing piece thus has only one contact face.

The invention shall now be described in more detail with reference to the enclosed drawings.

FIG. 1 illustrates, as a simplified example, the wear part of a known seine ring (without a replaceable wearing piece) and prior to the first cast of the purse seine.

FIG. 2 shows the known embodiment in FIG. 1 after approx. 20 casts and where the ring is at the end of the net.

FIG. 5 shows the section V—V in FIG. 4.

Figure 4:
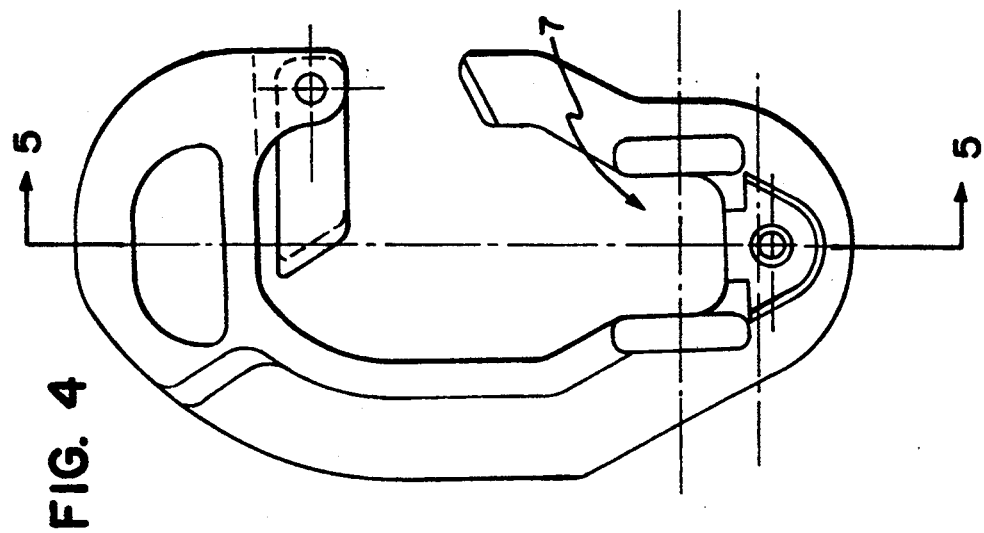
FIG. 4 depicts the seine ring in FIG. 3 without the mounted wearing piece.
Figure 3:
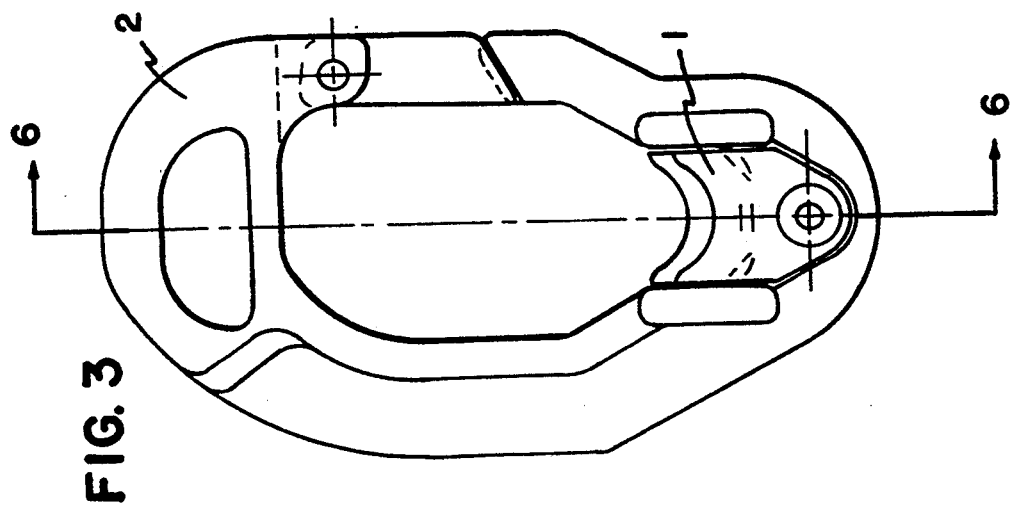
FIG. 3 depicts a seine ring with a mounted wearing piece, according to the invention.
Figure 6:
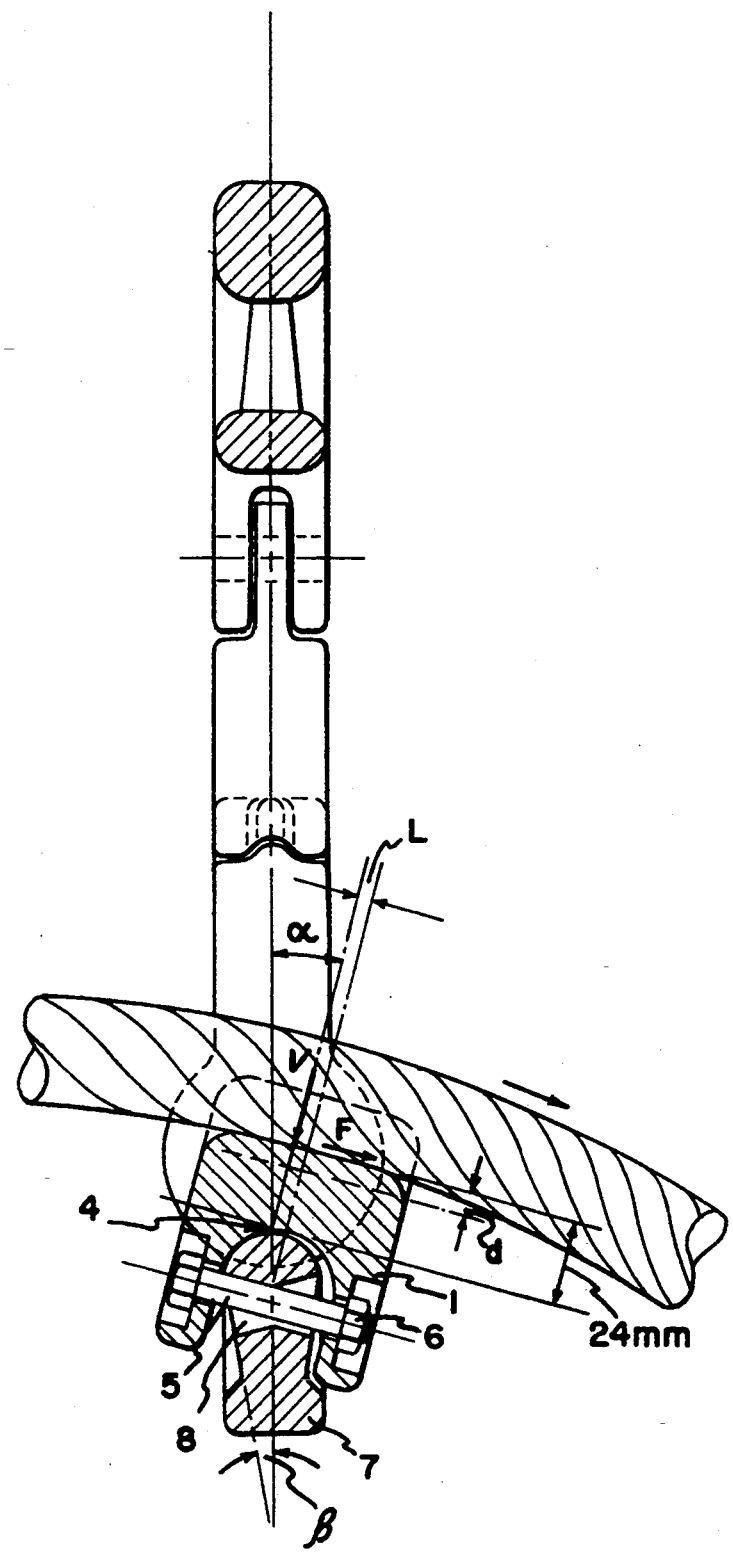
FIG. 6 shows the section VI—VI in FIG. 3 with the wearing piece in the tilted position and in engagement with the seine wire.

FIGS. 3 and 6 illustrate how the replaceable wearing piece 1 is connected to the seine ring 2, and how the wearing piece is turned by the seine wire 3 to the position that gives the greatest bearing area between the seine wire and the wearing piece on the seine ring. Consequently, the wearing piece will turn substantially around point 4, see FIG. 6. The wearing piece 1 is fixed by means of bolt 5 and nut 6 to a part 7 of the seine ring adapted for this function.

The moment of a couple is obtained around point 4 which will cause the wearing piece to turn to the most expedient position.

In the given example, see FIG. 6, the force P in the crowfoot is 700 kg. This gives a total vertical force V between the wearing piece and the seine wire 3 which is equal to 700 kg×cos 15°=676 kg.

The angle alpha on FIG. 6 is, in this example, 15°. The force V is fairly evenly distributed.

The frictional force F which tries to turn the wearing piece will be 676 kg×0.268=181 kg. This gives a moment around point 4 which is equal to L×676 kg=24 mm×181 kg which gives the dimension L=6.4 mm and a moment equal to 4.3 kgm.

The numerical values which have been given here are only to serve as an example to illustrate a practical embodiment form of the present invention, and must in no way be seen as limiting for the invention.

The dimension d in FIG. 6 denotes the wear on the wear surfaces of the wearing piece after approx. 40 casts of the seine net and with the ring positioned at the end of the net. The wear groove which is formed on the wearing piece is parallel to the direction of motion of the wire across the whole width of the wearing piece. The contact length, according to the preferred embodiment, is equal to 50 mm.

FIGS. 5 and 6 make it clear that the hole 8 through the mount part 7, which is adapted to the wearing piece, tapers towards the axial center of the hole at an angle of 15° (angle gamma) relative to the longitudinal axis of the hole.

As is also made clear in FIG. 6, the mount part 7 of the seine ring, at least over a portion of each side thereof, tapers in the direction from the connection area between said mount part and the wearing piece at an angle beta which is 15°.

The seine ring 2 is constructed in such a way that the tilting of the wearing piece 1 is limited to the most normal angle of friction for the material of which the wearing piece is made.

The advantages that are achieved with an automatically pivotal wearing piece are:

reduced wear on the seine wire and thus a greater wire life;

reduced wear on the tiltable wearing piece 1 and thus an increased longevity of the wearing life;

reduced friction between the wearing piece 1 and the seine wire 3, and thus less force to draw together the seine net; and reduced risk of the seine wire being worn through and thus a reduced danger of losing the catch due to the seine wire 3 being worn through.

Even though in the example angles alpha, beta and gamma are disclosed as being 15° as a preferred value, the value of these angles can reside generally within the range of from 10° to 20°.

Having described my invention, I claim:

1. A seine ring device, comprising:
   a seine ring;
   a replaceable wearing piece, said wearing piece being mounted on a mount part of the seine ring adapted for supporting said wearing piece and transferring forces exerted thereon to said seine ring;
   locking bolt means for mounting the wearing piece on the mount part, the locking bolt means pivotally engaging with a hole in said mount part, said wearing piece being tiltable at an angle from 10° to 20° to either side in relation to a mid plane of the seine ring;
   said hole being formed, seen from either side and along a longitudinal axis of said hole, to be tapered at an angle from 10° to 20° in relation to the longitudinal axis of the hole towards an axial center of the hole;
   said wearing piece having a clearance relative to the mount part to pivotally tilt relative to the mount part, caused by forces from a seine wire, so that a contact surface between the wearing piece and a wire is of maximum size irrespective of a direction of motion of the wire.

2. A device according to claim 1, wherein the mount part is provided with a rounded form to minimize the contact surface between said mount part and the corresponding adjacent wearing piece, a radius of curvature of a surface of said corresponding adjacent wearing piece is greater than a radius of curvature of a surface of said mount part.

3. A device according to claim 1, wherein the mount part, at least over a portion of each side, tapers at an angle from 10° to 20° in a direction away from the contact surface between the mount part and the wearing piece.

* * * * *